United States Patent
Rathjen et al.

(10) Patent No.: US 9,450,359 B2
(45) Date of Patent: Sep. 20, 2016

(54) INTERFACE APPARATUS AND METHOD FOR CONNECTING PLUG-IN UNITS TO A BUSWAY

(71) Applicant: SCHNEIDER ELECTRIC IT CORPORATION, West Kingston, RI (US)

(72) Inventors: Jonathan H. Rathjen, High Ridge, MO (US); Daniel J. Rohr, Wildwood, MO (US); Malee Alway, Wentzville, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 89 days.

(21) Appl. No.: 14/574,965

(22) Filed: Dec. 18, 2014

(65) Prior Publication Data
US 2016/0181748 A1    Jun. 23, 2016

(51) Int. Cl.
*H01R 4/60* (2006.01)
*H01R 25/16* (2006.01)
*H01R 43/00* (2006.01)

(52) U.S. Cl.
CPC ............ *H01R 25/162* (2013.01); *H01R 43/00* (2013.01)

(58) Field of Classification Search
CPC ........................ H01R 25/162; H01R 25/003
USPC ........... 439/215, 654, 440, 49, 211, 92, 170, 439/222, 640, 535, 557
See application file for complete search history.

(56) References Cited

U.S. PATENT DOCUMENTS

| | | | |
|---|---|---|---|
| 2,861,139 A | 11/1958 | Platz et al. | |
| 3,716,683 A | 2/1973 | Hafer | |
| 5,340,326 A * | 8/1994 | LeMaster | H01R 25/00 439/207 |
| 8,444,425 B2 * | 5/2013 | Byrne | H01R 4/185 439/215 |
| 2006/0052009 A1 * | 3/2006 | Johnson | H01R 12/592 439/660 |
| 2009/0239402 A1 * | 9/2009 | Byrne | H01R 25/00 439/215 |
| 2010/0190369 A1 * | 7/2010 | Byrne | H01R 4/185 439/215 |

OTHER PUBLICATIONS

Extended European Search Report from corresponding European Application No. 15200799.3 dated Apr. 21, 2016.

* cited by examiner

*Primary Examiner* — Phuongchi T Nguyen
(74) *Attorney, Agent, or Firm* — Lando & Anastasi, LLP

(57) ABSTRACT

An interface apparatus is configured to be mechanically secured and electrically coupled to a busway. The interface apparatus includes a housing configured to mate with the busway and a plug-in interface coupled to the housing. The plug-in interface is configured to receive a plug-in unit. The interface apparatus further includes an electrical coupling assembly coupled to the housing and configured to move between an uncoupled position in which the plug-in interface is uncoupled to the busway and a coupled position in which the plug-in interface is electrically coupled to the busway. The interface apparatus further includes an actuator assembly coupled to the housing and the electrical coupling assembly. The actuator assembly is configured to move the electrical coupling assembly between the uncoupled and coupled positions and to secure the plug-in unit to the housing.

16 Claims, 13 Drawing Sheets

INTERFACE APPARATUS AND METHOD FOR CONNECTING PLUG-IN UNITS TO A BUSWAY

RELATED APPLICATION

This application relates to U.S. patent application Ser. No. 14/574,977 entitled RECESSED MOVABLE JAWS FOR CONNECTING A PLUG-IN UNIT TO A BUSWAY, by Jonathan H. Rathjen and Malee Alway, filed on even date herewith and incorporated herein by reference.

BACKGROUND OF DISCLOSURE

1. Field of Disclosure

This disclosure is directed to busways used in data centers, and more particularly to an interface that can be used to install, remove and replace a plug-in unit to and from the busway without having to power down ("off") the busway, and to a method of installing, removing and replacing the plug-in unit on the busway.

2. Discussion of Related Art

Busway electrical distribution systems are well known in the art of electrical distribution. Busway systems are comprised of a number of factory assembled sections, each including a number of individually insulated generally flat electrical conductors or busbars stacked one upon another and enclosed within a housing which provides protection and support for the busbars. For example, typical powerbus busway systems have ten-foot (or four-foot) sections of flat, stacked, electrical conductors for transporting electrical energy from a point A to a point B, while distributing the electrical energy to various electrical loads. Busway construction is modular, and, in many ways, is superior to cable and conduit systems from an installation standpoint.

For distribution of the electrical energy, the busway sections include one or more plug-in outlets having a plurality of conductive contact points on the internal busbars. In general, the plug-in outlets include openings that are provided through the housing of the busway system at each of a plurality of power tap-off sections to expose conductive material of the busbars for connection with an appropriate connecting jaw. A plug-in unit, which is used to tap off power from the busway, is attached to the plug-in opening by mounting a plurality of jaws to the respective busbars.

When adding, removing or replacing the plug-in unit to and from the busway, it is advised or sometimes required to power down the busway prior to performing one of these functions. As busways are used increasingly within data centers, the requirement to have to first power down the powerbus busway before making any changes to the plug-in unit population is somewhat onerous, since powering down the powerbus busway means a portion of the data center is down for operation. The temptation may exist to ignore this requirement and perform "live work" by "hot swapping" the plug-in unit.

One approach used to prevent the temptation of not powering down the busway is to place numerous warning labels on the equipment and within the installation manual associated with the plug-in unit. Such warnings encourage the person installing the plug-in unit to first power down the powerbus busway before making any changes. A disadvantage associated with this approach is that "hot swapping" still occurs despite the warnings due to the installer's desire to maintain a high level of uptime in the data center.

Another approach is for the installer or operator to have two separate feeds, and to employ one feed when powering down the other feed. A disadvantage associated with this approach is that there is no redundancy when one feed is powered down.

SUMMARY OF DISCLOSURE

One aspect of the present disclosure is directed to an interface apparatus configured to be mechanically secured and electrically coupled to a busway. In one embodiment, the interface apparatus comprises a housing configured to mate with the busway and a plug-in interface coupled to the housing. The plug-in interface is configured to receive a plug-in unit. The interface apparatus further comprises an electrical coupling assembly coupled to the housing and configured to move between an uncoupled position in which the plug-in interface is uncoupled to the busway and a coupled position in which the plug-in interface is electrically coupled to the busway. The interface apparatus further comprises an actuator assembly coupled to the housing and the electrical coupling assembly. The actuator assembly is configured to move the electrical coupling assembly between the uncoupled and coupled positions and to secure the plug-in unit to the housing.

Embodiments of the interface apparatus further may include a mechanical coupling assembly coupled to the housing and configured to releasably secure the housing to the busway. The mechanical coupling assembly may include a first bracket configured to engage a top of the busway. The mechanical coupling apparatus further may include a second bracket secured to the housing and a hook coupled to the second bracket and configured to secure the housing to the busway. The actuator assembly may include a lever coupled to the housing and the electrical coupling assembly. The lever may be movable between a first position in which the housing is configured to receive the plug-in unit, a second position in which the plug-in unit is secured to the housing and the electrical coupling assembly is in the uncoupled position, and a third position in which the plug-in unit is secured the housing and the electrical coupling assembly is in the coupled position. The actuator assembly further may include a finger movable by the lever to releasably secure the plug-in unit to the housing when moving the lever between the first position and the second position. The electrical coupling assembly may include jaws configured to engage the busway. The jaws may be coupled to the lever, with the jaws being movable by the lever when moving the lever from the second position in which the jaws achieve a disengaged position associated with the uncoupled position of the electrical coupling assembly with the jaws being spaced from the busway to the third position in which the jaws achieve an engaged position associated with the coupled position of the electrical coupling assembly with the jaws engaging the busway. The housing may include at least one bracket configured to align the plug-in unit to the housing.

Another aspect of the disclosure is directed to a method of securing a plug-in unit to a busway. In one embodiment, the method comprising: securing an interface apparatus to the busway; securing the plug-in unit to the interface apparatus; and selectively electrically coupling the plug-in unit to the busway via the interface apparatus.

Embodiments of the method further may include moving a lever associated with the housing between a first position in which the housing is configured to receive the plug-in unit, a second position in which the plug-in unit is secured to the housing and the plug-in unit is electrically uncoupled to the busway, and a third position in which the plug-in unit is secured to the housing and electrically coupled to the busway. Selectively electrically coupling the plug-in unit to the busway may include moving jaws of the interface apparatus that are coupled to the lever between a uncoupled position in which the jaws are spaced from the busway and the plug-in unit is electrically uncoupled from the busway and the lever is in its second position, and a coupled position in which the jaws engage the busway and the plug-in unit is electrically coupled to the busway and the lever is in its third position. Mechanically coupling the interface apparatus to the busway may include releasably securing a housing of the interface apparatus to the busway.

Yet another aspect of the disclosure is directed to an interface apparatus comprising a housing configured to mate with the busway and a plug-in interface coupled to the housing, with the plug-in interface being configured to receive a plug-in unit. The interface apparatus further includes means for electrically coupling the plug-in interface to the busway between an uncoupled position in which the plug-in interface is uncoupled to the busway and a coupled position in which the plug-in interface is electrically coupled to the busway, and means for actuating the movement of the electrical coupling means between the uncoupled and coupled positions and to secure the plug-in unit to the housing.

Embodiments of the interface apparatus further may include means for mechanically coupling the housing to the busway. The means for actuating the movement of the electrical coupling means may include a lever coupled to the housing and movable between a first position in which the housing is configured to receive the plug-in unit, a second position in which the plug-in unit is secured to the housing and the electrical coupling means is in the uncoupled position, and a third position in which the plug-in unit is secured the housing and the electrical coupling means is in the coupled position. The means for actuating the movement of the electrical coupling means further may include a finger movable by the lever to releasably secure the plug-in unit to the housing when moving the lever between the first position and the second position. The electrical coupling means may include jaws configured to engage the busway. The jaws may be coupled to the lever, with the jaws being movable by the lever when moving the lever from the second position in which the jaws achieve a disengaged position associated with the uncoupled position of the electrical coupling assembly with the jaws being spaced from the busway to the third position in which the jaws achieve an engaged position associated with the coupled position of the electrical coupling assembly with the jaws engaging the busway. The housing may include at least one bracket configured to secure the plug-in unit to the housing.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
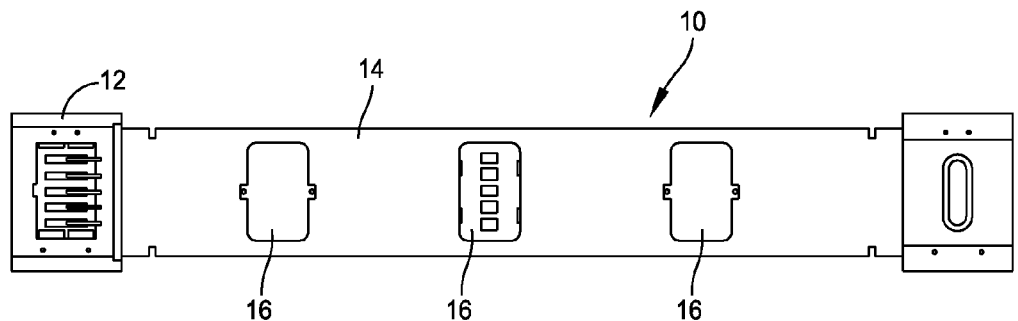
FIG. 1 is a front view of a busway.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including", "comprising", "having", "containing", "involving", and variations thereof herein, is meant to encompass the items listed thereafter and equivalents thereof as well as additional items.

Busways may be used to provide power to modules positioned within configurable racks located within the data center. Busways are used in many electrical power distribution devices, such as power modules, switching apparatus, distribution apparatus, and batteries. As mentioned above, it is advised or sometimes required to power down the busway prior to performing one of these functions when adding, removing or replacing a plug-in unit to and from the busway. Existing powerbus busways are sold primarily into factory or warehouse locations where they are less critical to power down the busway when changing the population of the plug-in units. In this environment, there is little impetus to develop a mechanism that enables plug-in units to be mechanically and electrically secured to the busway in a hot swappable manner. However, as mentioned above, the electronic equipment housed within the data center oftentimes perform critical tasks. In such instances, it is very desirable to avoid powering down the busways. The interface apparatus of embodiments of the present disclosure enable the operator of the data center to incorporate them on the busways of the data center to allow for adding or replacing plug-in units when the busway is powered on.

An interface apparatus of embodiments of the present disclosure enable operators of data centers to install, remove and replace plug-in units without having to power down a busway. By switching the interface apparatus to an "off" position, the operator can install the plug-in unit, for example, without having to power down the busway. Once installed, the operator switches the interface apparatus to an "on" position in which power is provided to the plug-in unit. Advantages of the interface apparatus include, but are not limited to, isolating live electrical conductors from the person installing the plug-in unit, securing an arc blast barrier to further protect the person installing the plug-in unit, ensuring a complete, well-grounded enclosure to conduct any arc blast to ground prior to making any other connection, and mechanically securing the plug-in unit to the interface apparatus to prevent removal of the plug-in unit while powered by the busway. Thus, critical loads within the data center, e.g., servers, can remain powered "on" even when making changes to the population of the plug-in units, as long as the interface apparatus is installed as an interface between the busway and the plug-in unit.

In one embodiment, an actuator handle or lever on a side of a housing of the interface apparatus achieves two distinct functions. One function is to mechanically secure a plug-in unit to the interface apparatus. Another function is to apply power to the plug-in unit. When the lever is initially raised, a mechanical connection inside the housing moves a vertical retention J-hook to secure the J-hook of the plug-in unit to the interface apparatus and prevent removal of the plug-in unit. The rest of the upward travel of the lever moves the jaws into contact with the busbars and by doing so applies power to the plug-in unit. When in this position, the plug-in unit is secured to the interface apparatus and prevented from being removed from the interface apparatus. The removal of the plug-in unit when powered by the busway is prevented as long as the plug-in unit is powered.

An interface apparatus of embodiments of the present disclosure can be configured as a one-, two-, three-, four-, or five-pole internal manual disconnect switch to allow an operator to install, remove or replace a plug-in unit on a "live" busway. The handle or lever of the interface apparatus is provided to secure and enable electrical connection as described above. A back of the housing of the interface apparatus has jaws that connect to busbars located inside the busway. A front of the housing of the interface apparatus includes a replica of the plug-in interface provided on the busway to accept jaws from a standard plug-in unit. Between the front and the back of the housing of the interface apparatus is an electrical insulator that prevents physical access to the unswitched phases or neutral by the front opening and will further serve as an arc blast shield to prevent an arc blast from getting past the insulator, keeping the plug-in unit side safe. The switch will be on the busway side of the insulator, keeping the plug-in unit side safe. A top of the housing of the interface apparatus replicates a top of the busway, to include a ground clip to connect to busway ground, and, if needed, to include a conductive pad area to accept ground clip from the plug-in unit, and to allow for connecting of the fixed bracket from the plug-in unit.

One surface (for example, side or bottom) can have a stud or nut insert with masked off area to facilitate connection of a supplemental grounding wire, such as leakage current grounding wire, with internal jumper wire to facilitate connecting this chassis ground to the grounding jaw, or to allow for isolated ground. One or more attaching fasteners, such as "J" bolts, to securely attach the "interface box" to the busway, and also support weight of the plug-in unit and its power cord (whip).

Referring to the drawings, and more particularly to FIG. 1, a powerbus busway or busway is generally indicated at 10. As shown, in one embodiment, the busway 10 includes a four-foot busway straight section 14, although any length may be provided. A connector 12 is provided to connect the busway straight section 14 to another busway straight section. The power feed unit 12 connects incoming cables and conduits to power the busway straight section 14. In some embodiments, the power feed 12 unit may include a metering device to monitor power consumption of the busway straight section 14, while barrier compartments provide access to the metering device. The busway straight section 14 includes several high-density outlet ports, each indicated at 16, which are spaced apart from one another along a length of the busway straight section. Spring-type bus joint connections, sometimes referred to as stabs, may be provided for each port to ease installation and reduce maintenance.

Figure 2:
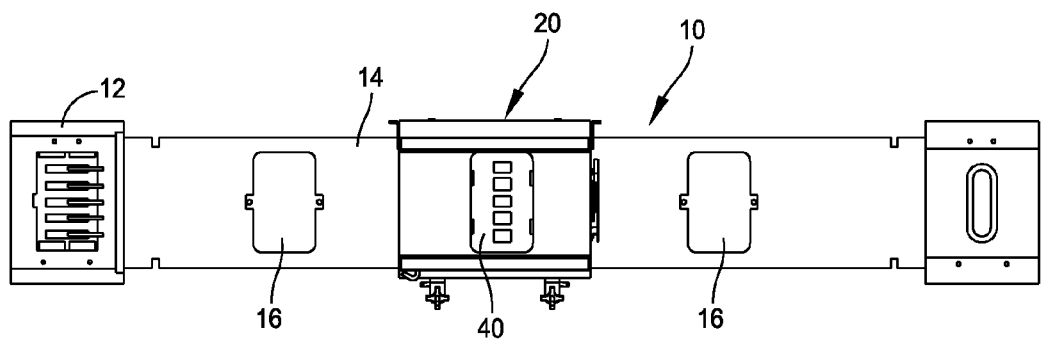
FIG. 2 is a front view of the busway having an interface apparatus of embodiments of the present disclosure mechanically and electrically coupled to the busway.

Referring to FIG. 2, an interface apparatus, generally indicated at 20, of embodiments of the present disclosure is mounted on the busway straight section 14 on one of the outlet ports 16. As will be described in greater detail below with reference to the drawings, the interface apparatus 20 enables operators of data centers to install, remove and replace plug-in units without having to power down the busway 10. By switching the interface apparatus 20 to an "off" position, the operator can install the plug-in unit, for example, without having power down the busway 10. Once installed, the operator switches the interface apparatus 20 to an "on" position in which power is provided to the plug-in unit.

Figure 3:
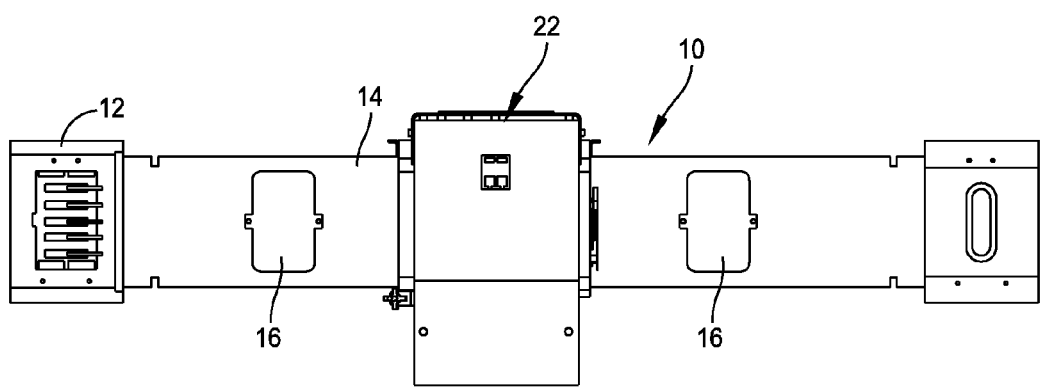
FIG. 3 is a front view of the busway having a plug-in unit plugged into the interface apparatus.

Referring to FIG. 3, a plug-in unit, generally indicated at 22, is secured and electrically connected to the interface apparatus 20. The arrangement is such that the busway 10 provides power to the plug-in unit 22 via the interface apparatus 20. In one embodiment, the plug-in unit 22 is configured to be secured (mechanically and electrically) to the interface apparatus 20 without the use of tools and without having to power down the busway 10. A typical plug-in unit includes a housing 24 that houses a circuit breaker or fusible disconnect assembly. The connection of the plug-in unit 22 to the interface apparatus 20 is made by electrical jaws provided in the plug-in unit, which correspond to contact points of the internal busbars inside the front opening outlet port of the interface apparatus. On one end of the plug-in unit 22, the electrical jaws engage the corresponding busbars, and on another end, the electrical jaws engage a corresponding connector of the electrical device being connected (e.g., an electrical connector of a circuit breaker).

Figure 4:
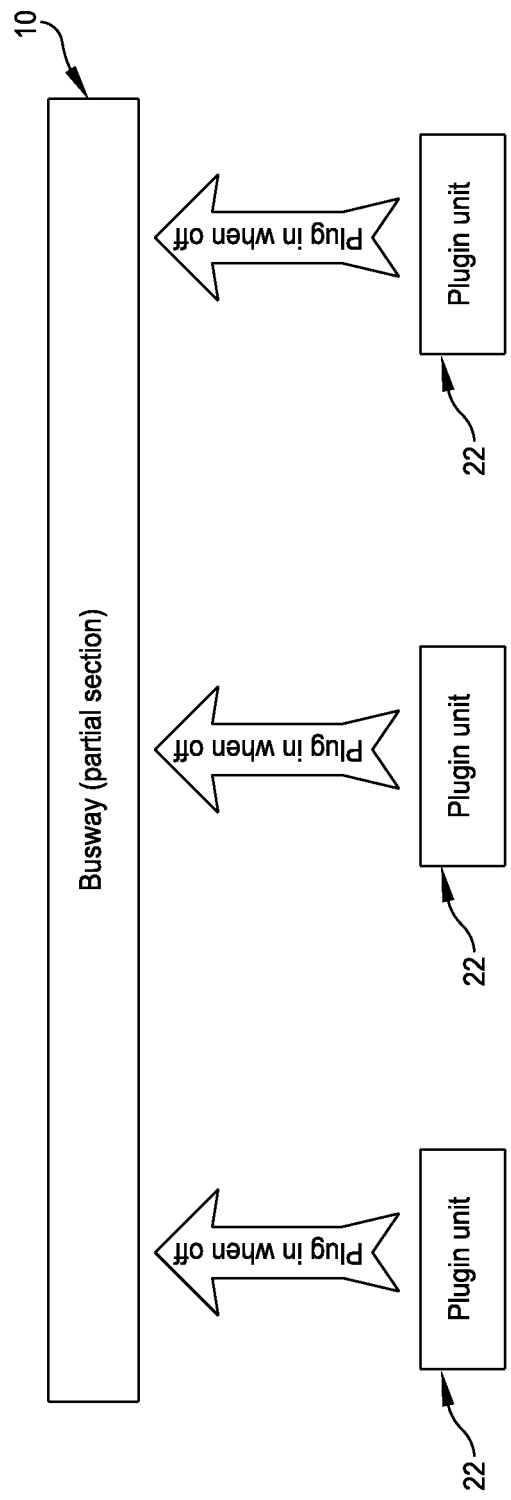
FIG. 4 is a schematic view of a known method of connecting the plug-in units directly to the busway.
Figure 5:
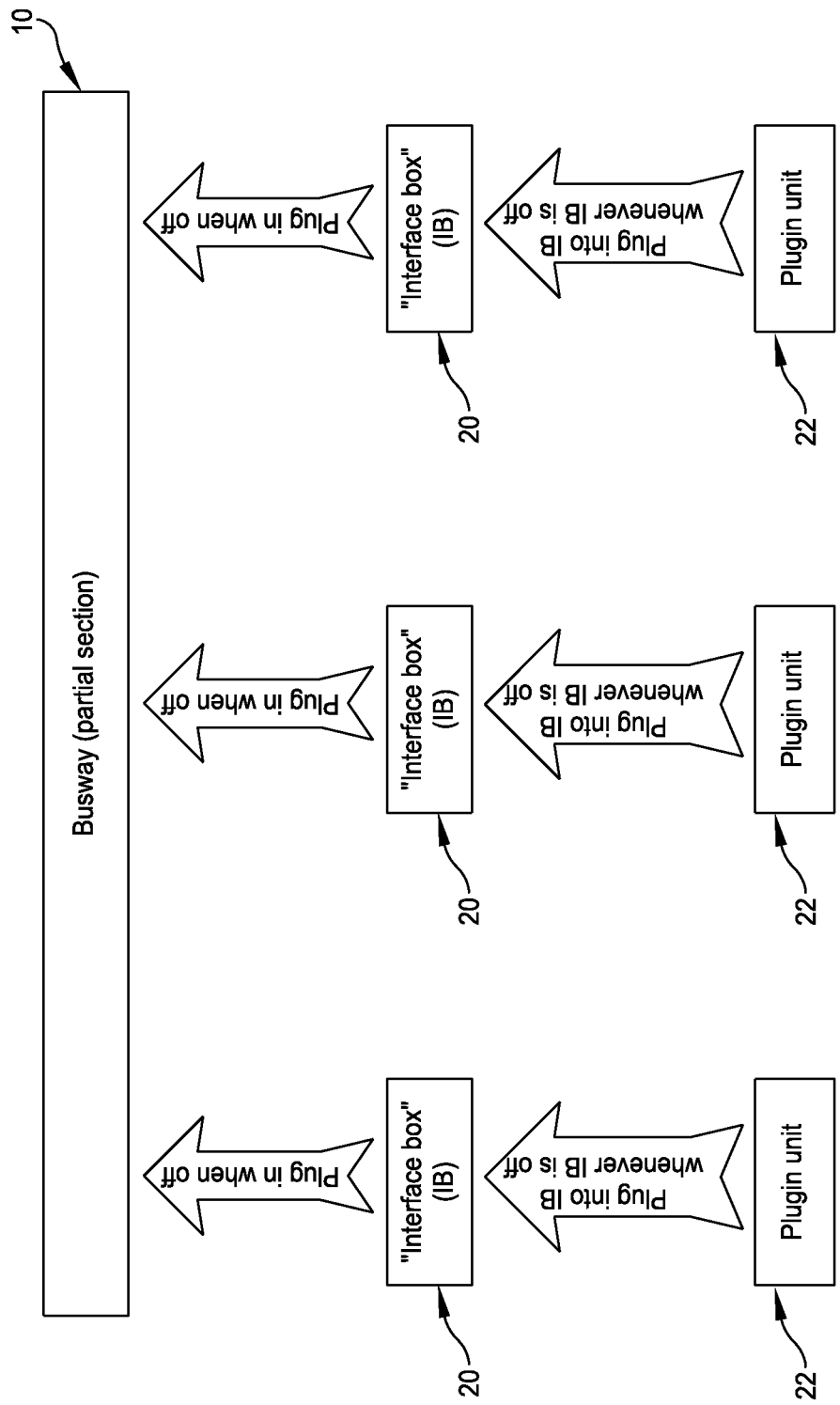
FIG. 5 is a schematic view of a method of the present disclosure of connecting the plug-in units to the busway by the interface apparatus.

Referring to FIGS. 4 and 5, the plug-in units 22 can be connected directly to the busway 10 in the traditional manner (FIG. 4) or connected to the busway via the interface apparatus 20 (FIG. 5). As shown in FIG. 4, the busway 10 must be powered down prior to connecting the plug-in units 22 to the busway. In FIG. 5, the interface apparatus 20 also must be powered down and in the "off/release" position prior to connecting to the busway 10, and the interface apparatus 20 must also be powered down and in the "off/release" position prior to connecting the plug-in units 22. However, once connected, the busway 10 can remain powered "on" when attaching the plug-in units 22 to their respective interface apparatus. Thus, when securing the plug-in units 22 to their respective interface apparatus 20, the interface apparatus can be manipulated to maintain connection to the busway 10 while the busway is powered "on" while providing a safe environment for the person installing the plug-in units.

Figure 9:
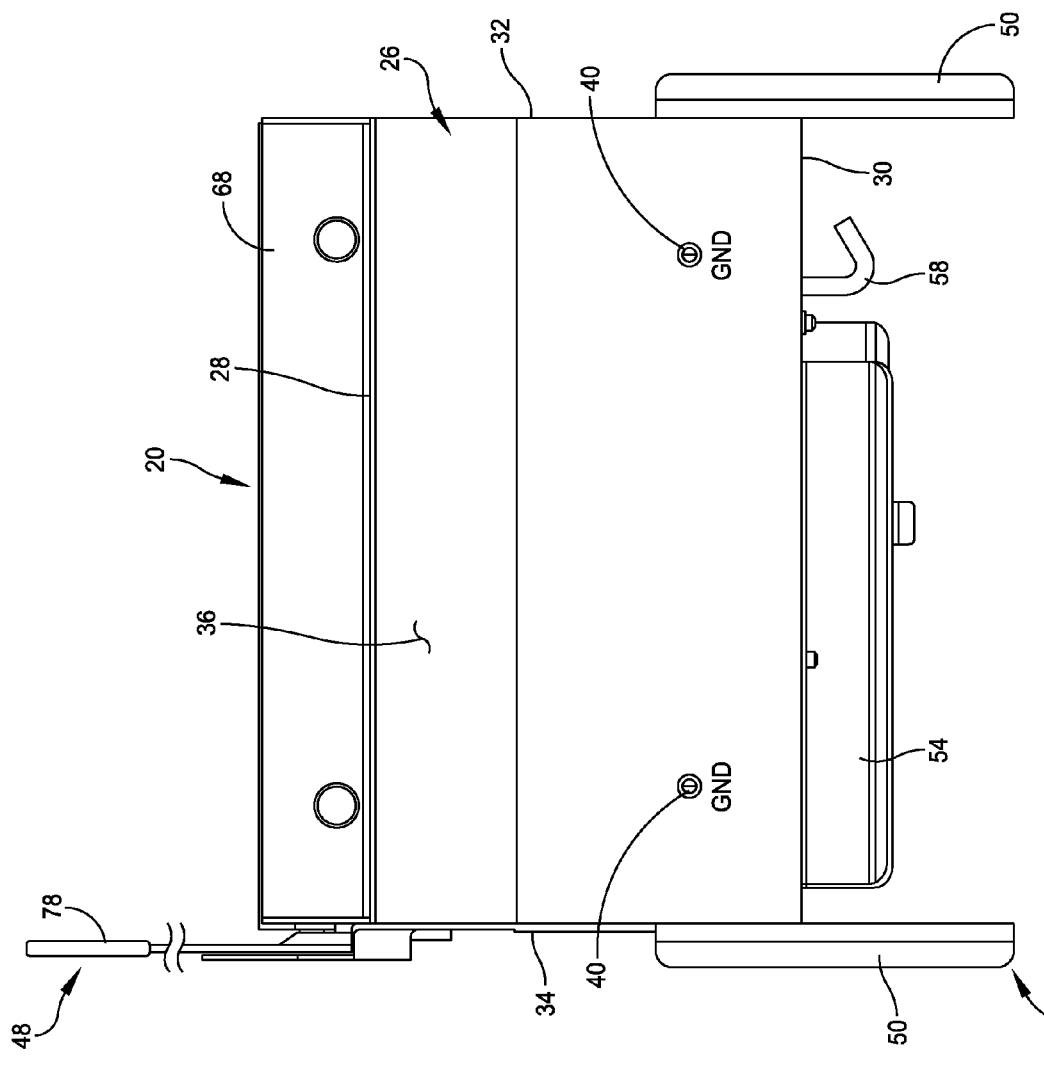
FIG. 9 is a top view of the interface apparatus.

Referring to FIGS. 6-11, the interface apparatus 20 of embodiments of the present disclosure includes a housing generally indicated at 26 that is sized and shaped to receive the components of the interface apparatus within the housing. As shown in the drawings, the housing 26 of the interface apparatus 20 includes a front wall 28, a back wall 30, side walls 32, 34, a top wall 36 and a bottom wall 38. The front wall 28 of the housing 26 includes a plug-in interface 40, which is capable of receiving a plug-in unit 22 in the well known manner. The plug-in interface 40 can be configured with one-, two-, three-, four-, or five-pole contact points of the internal busbars. The housing 26 of the interface apparatus 20 can be fabricated from sheet metal or some other suitable alloy or material that is capable of supporting the components of the interface apparatus. As shown in FIG. 9, two nut inserts, each indicated at 42, are secured to the top wall 36 of the housing 26 to provide supplement grounding of the interface apparatus 20.

The interface apparatus 20 also includes a mechanical coupling assembly, generally indicated at 44, which is coupled to the housing 26 and configured to move the housing between an uncoupled position in which the housing is unsecured from the busway 10 and a coupled position in which the housing is mechanically secured to the busway. The interface apparatus 20 further includes an electrical coupling assembly, generally indicated at 46, which is coupled to the housing 26 and configured to move back and forth between a retracted, uncoupled position in which the electrical coupling assembly is uncoupled to the busway 10 and an extended, coupled position in which the plug-in interface is electrically coupled to the busway. The interface apparatus 20 further includes an actuator assembly, generally indicated at 48, which is coupled to the housing 26 and configured to secure the plug-in unit 22 to the housing 26 of the interface apparatus 20, and to move the electrical coupling assembly 46 between its uncoupled retracted and coupled extended positions. The arrangement is that the actuator assembly 48 controls the mechanical connection of the plug-in unit 22 to the interface apparatus 20 and the electrical connection of the plug-in unit to the busway 10.

In the shown embodiment, the mechanical coupling assembly 44 includes two mounting brackets, each indicated at 50, which are secured to respective side walls 32, 34 of the housing 26 of the interface apparatus 20. As shown, the mounting brackets 50 are secured to the upper portions of the side walls 32, 34 and extend beyond a plane defined by the back wall 30. Each mounting bracket 50 includes at least one notch 52 formed therein to hang the mounting bracket and the housing 26 on the straight section 14 of the busway 10.

Figure 11:
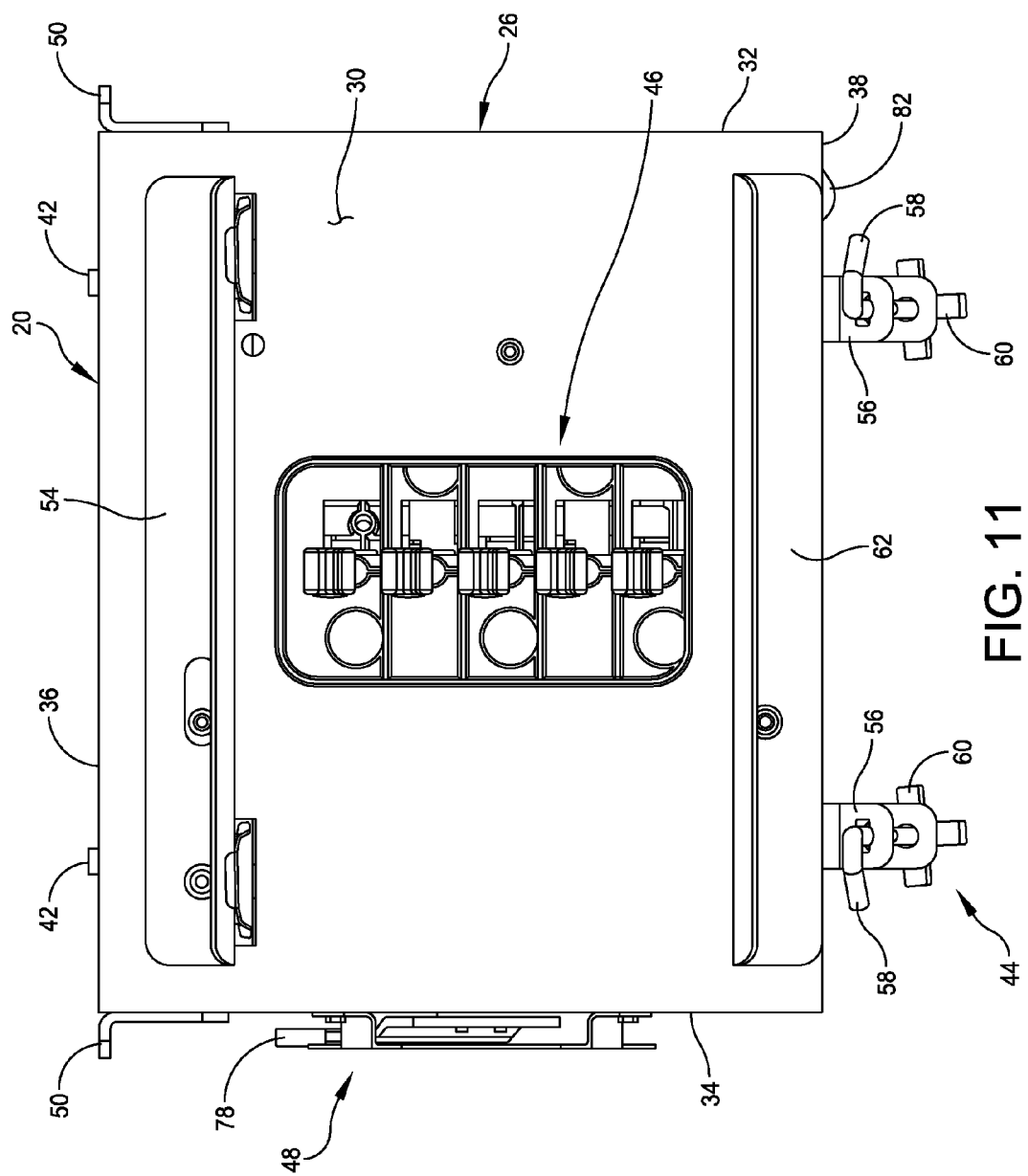
FIG. 11 is a back view of the interface apparatus.

The mounting brackets 50 may be specifically configured to engage the straight section 14 of the busway 10 depending on the type and size of busway being used. As shown in FIG. 11, the mechanical coupling assembly 44 further includes an upper horizontal alignment bracket 54, which is secured to the back wall 30 of the housing 26 of the interface apparatus 20 at an upper portion of the back wall. The upper horizontal alignment bracket 54 is provided to align and support an upper portion of the housing 26 when the housing is supported on the busway 10.

To secure a lower portion of the housing 26 of the interface apparatus 20 to the busway 10, the mechanical coupling assembly 44 further includes two hook brackets, each indicated at 56, mounted on the bottom wall 38 of the housing. As shown, each hook bracket 56 extends from a front of the housing 26 to the back of the housing, with the hook brackets being spaced apart from one another. Each hook bracket 56 is configured to receive a hook 58, which extends through two openings provided in the hook bracket. The hook 58 includes a speed nut 60 (and a lock nut (not shown)) to prevent the speed nut from coming off or being removed without a tool) to loosen or tighten the hook to allow the hook to slide back and forth in the hook bracket so that hook moves axially with respect to the hook bracket 56. The arrangement is such that the hooks 58 secure or otherwise lock in place the housing 26 of the interface apparatus 20 to the busway 10 when the speed nut 60 is tightened while the hook 58 is positioned pointing up on a far side of a lip on a bottom of the busway 10. In the shown embodiment, the hook brackets 56 are configured so that the hooks 58 are slightly angled with respect to a horizontal plane to more effectively secure the bottom portion of the housing 26 to the busway 10. The mechanical coupling assembly 44 further includes a lower horizontal alignment bracket 62, which is secured to the back wall 30 of the housing 26 of the interface apparatus 20 at a lower portion of the back wall. The lower horizontal alignment bracket 62 is provided to align the lower of the housing 26 when the housing is supported on the busway 10.

Figure 10:
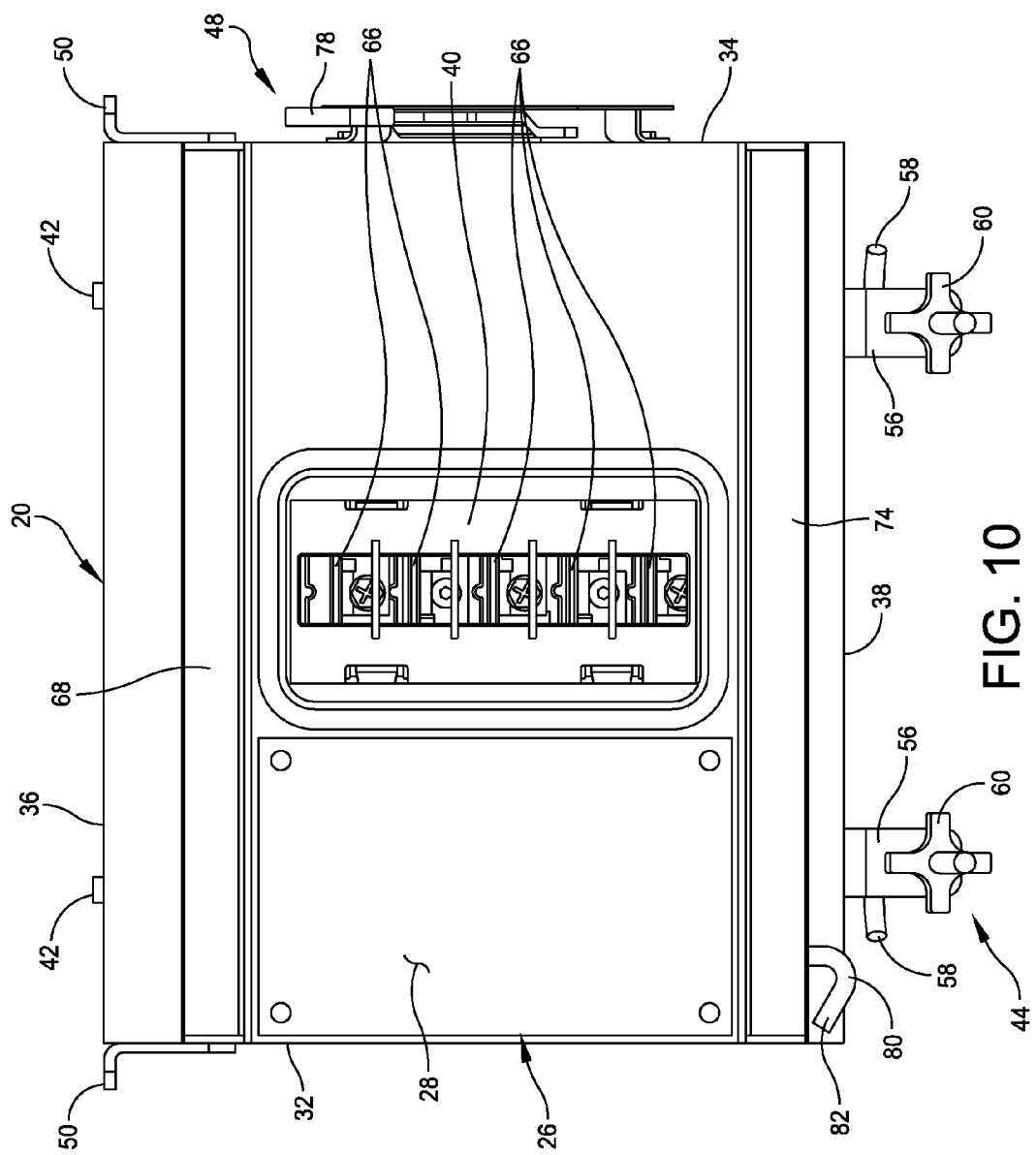
FIG. 10 is a front view of the interface apparatus.

With particular reference to FIGS. 10 and 11, the electrical coupling assembly 46 is configured internally to provide electrical connection between the plug-in interface 40 (FIG. 10) and movable electrical jaws 64 (FIG. 11), which are configured to engage the busway 10. As shown in FIG. 10, the plug-in interface 40 includes contact points on the internal busbars, each indicated at 66, which are configured to receive the electrical jaws provided in the plug-in unit. As shown in FIG. 11, the movable electrical jaws 64 correspond to the contact points on the internal busbars provided on the outlet ports 16 of the straight section 14 of the busway 10. The movable electric jaws 64 are configured to move between a disengaged position in which the movable electrical jaws are retracted within the housing 26 of the interface apparatus 20 (FIG. 12) and an engaged position in which the movable electrical jaws are extended from the housing (FIG. 7) to engage the contact points on the internal busbars of the outlet ports 16 of the busway 10 to provide an electrical connection between the busway and the plug-in unit 22. The manner in which the movable electrical jaws 64 are moved between their disengaged (retracted) and engaged (extended) positions will be described in greater detail when the actuator assembly 48 is described.

Figure 6:
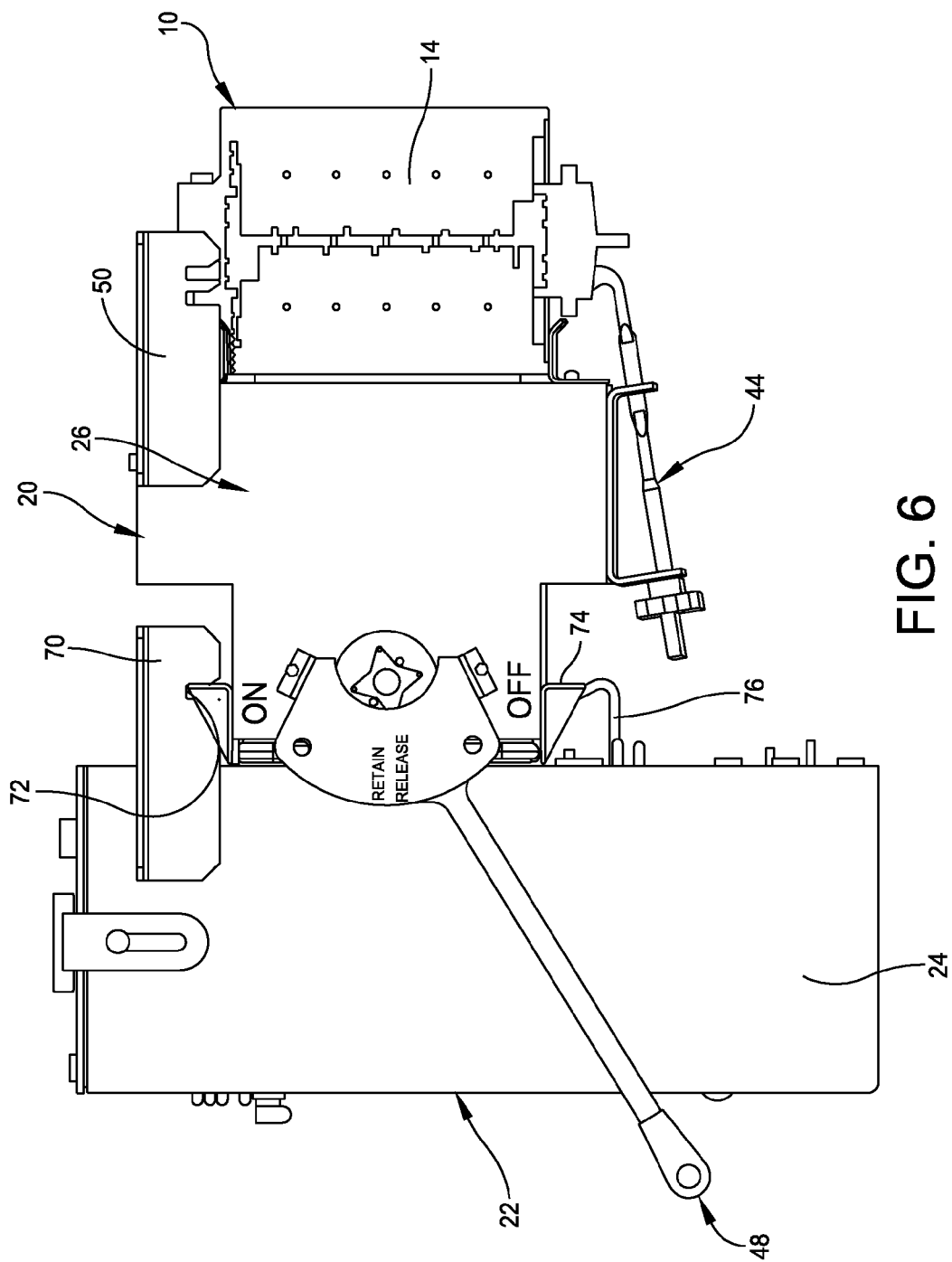
FIG. 6 is a side view of the busway, the interface apparatus and the plug-in unit shown in FIG. 3.
Figure 7:
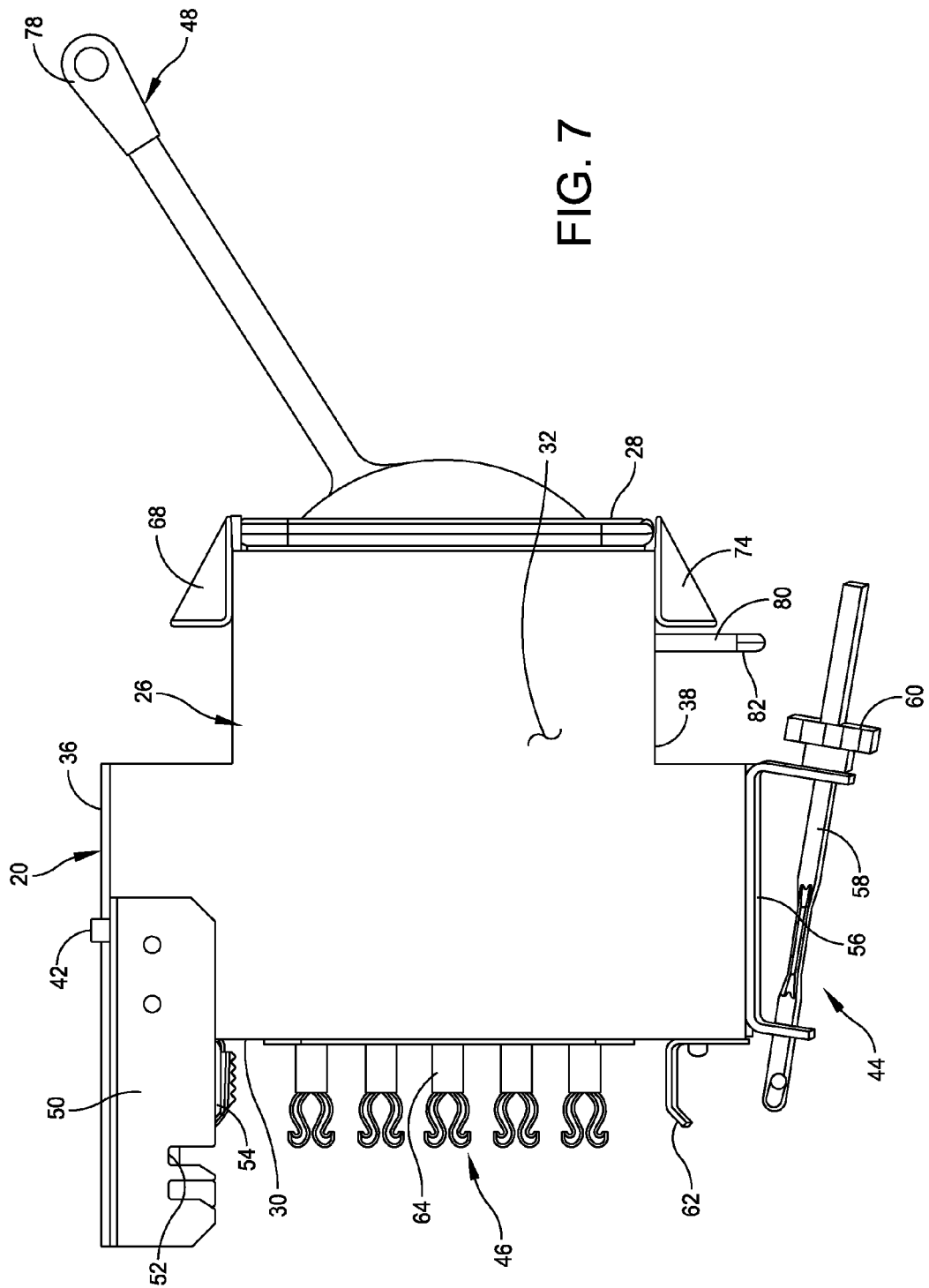
FIG. 7 is an opposite side view of the interface apparatus with the lever in the retain or on position.
Figure 8:
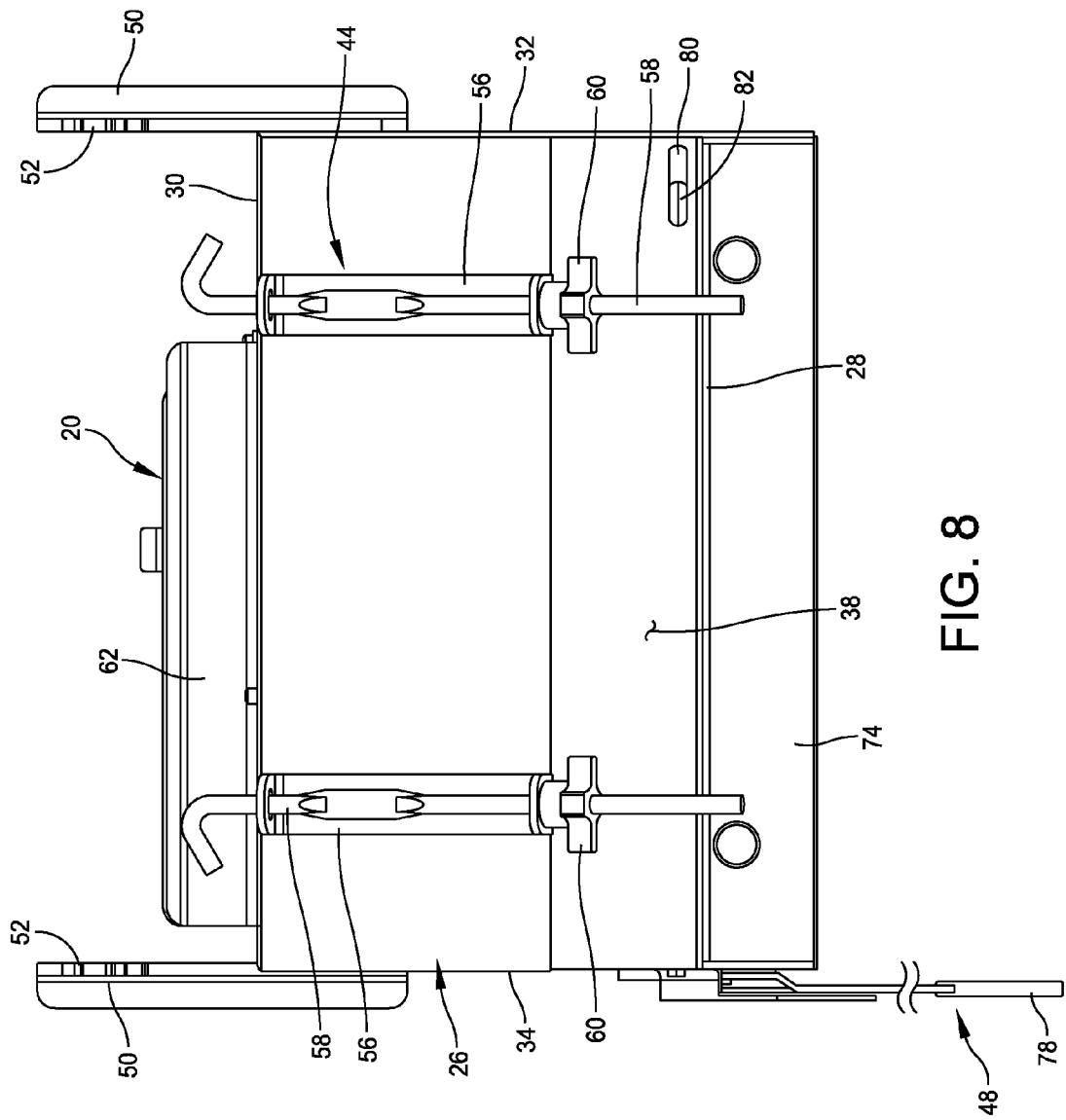
FIG. 8 is a bottom view of the interface apparatus.

To secure the plug-in unit 22 to the interface apparatus 20, the housing 26 of the interface apparatus has an upper receiver bracket 68 secured to the top wall 36 of the housing. As shown in FIG. 6, the upper receiver bracket 68 is configured to receive a top mounting bracket 70 provided on the housing 24 of the plug-in unit 22. A notch 72 is provided in the top mounting bracket 70 of the housing 24 of the plug-in unit 22 which then allows the upper receiver bracket 68 to secure the top portion of the housing 24 of the plug-in unit 22 to the housing 26 of the interface apparatus 20. The housing 26 of the interface apparatus 20 further has a lower receiver bracket 74 secured to the bottom wall 38 of the housing to receive a horizontal J-hook 76 provided on the housing 24 of the plug-in unit 22. As shown in FIG. 6, the horizontal J-hook 76 of the plug-in unit 22 is received within the lower receiver bracket 74 of the housing 26 of the interface apparatus 20 to secure the lower portion of the housing of the plug-in unit with respect to the housing of the interface apparatus.

Figure 12:
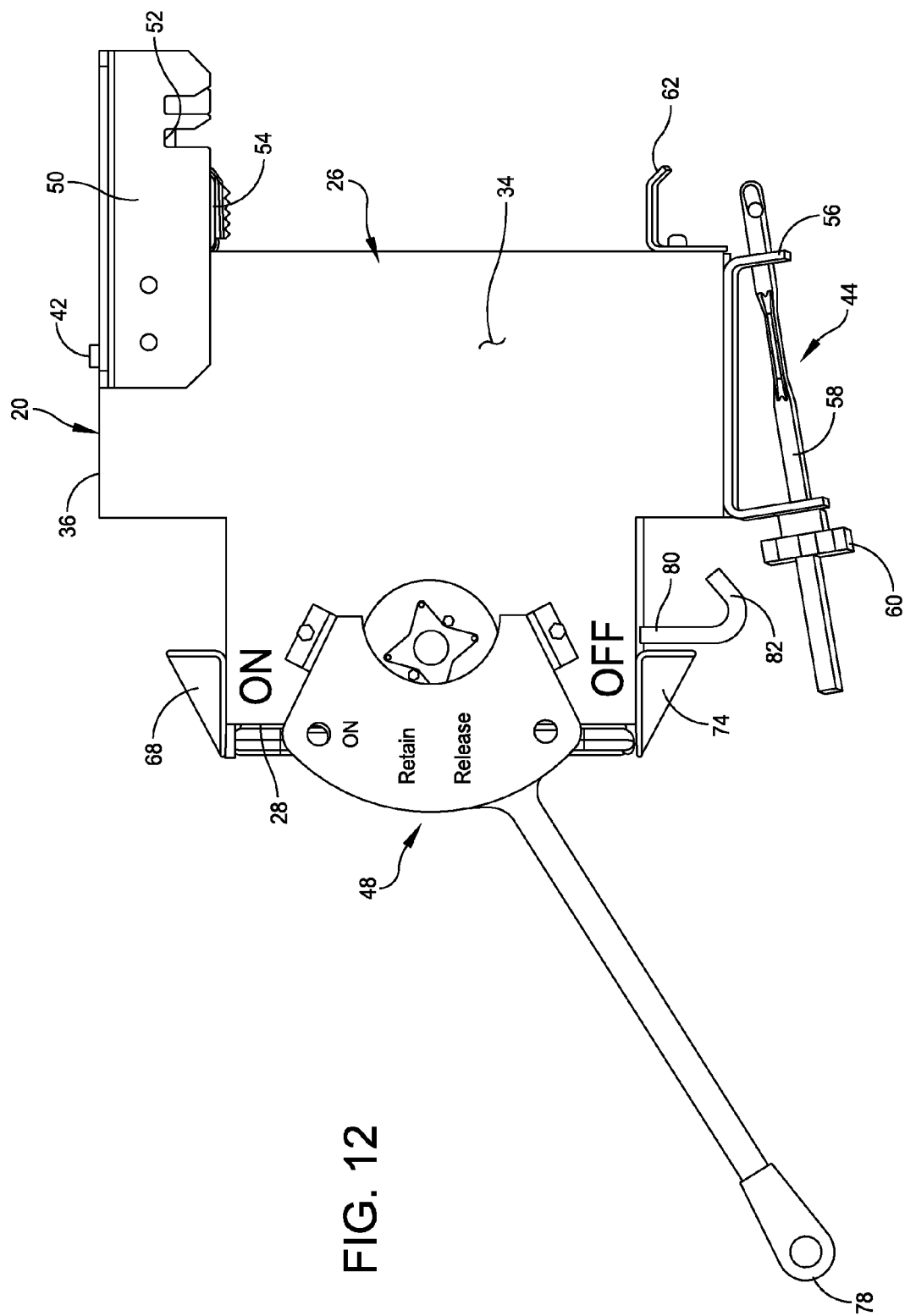
FIG. 12 is a side view of the interface apparatus with a lever of the interface apparatus shown in a release or off position.
Figure 13:
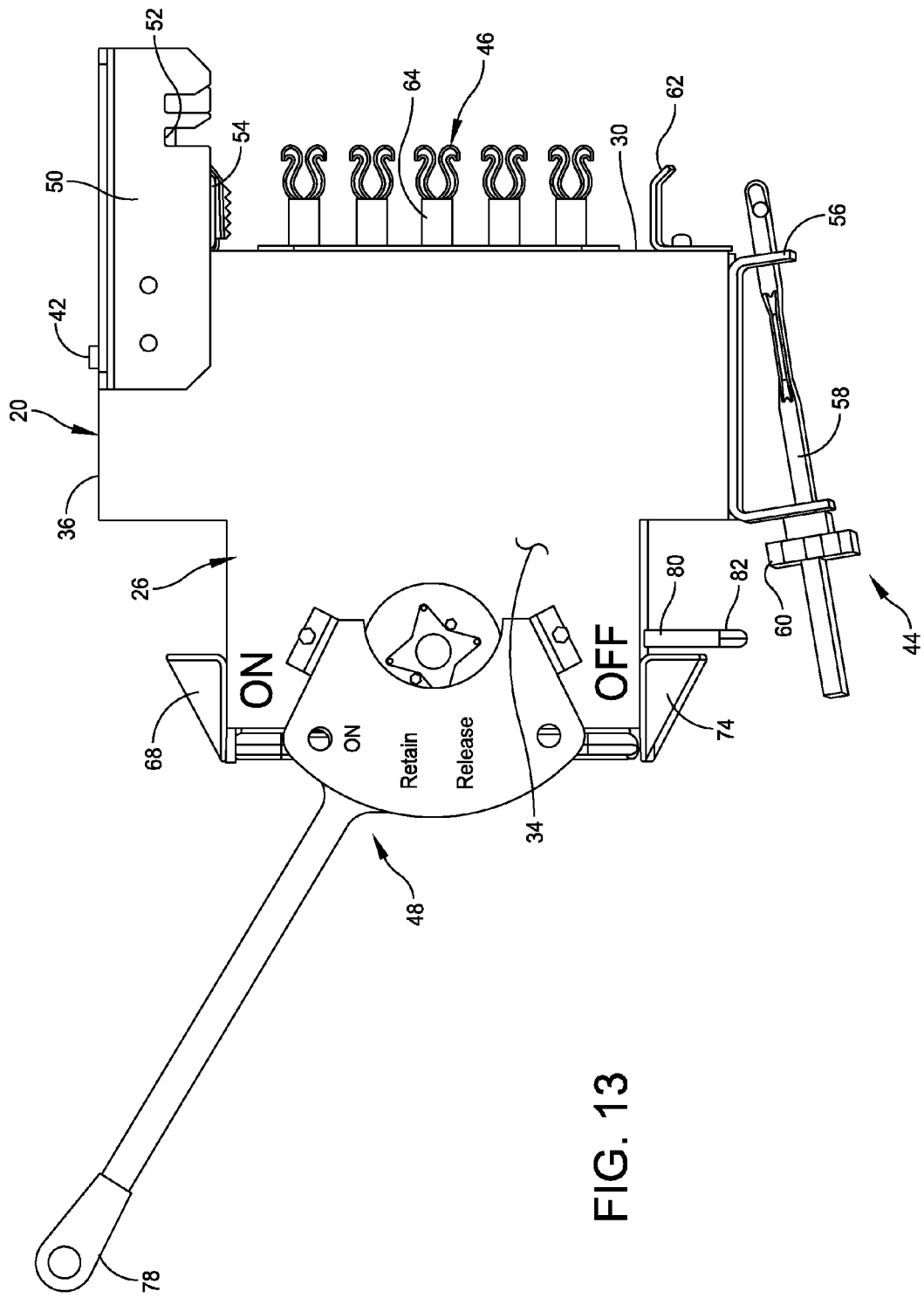
FIG. 13 is a side view of the interface apparatus with the lever in a retain or on position.

Referring additionally to FIGS. 12 and 13, as mentioned above, the actuator assembly 48 is designed to further secure the plug-in unit 22 to the housing 26 of the interface apparatus 20 and to move the electrical coupling assembly 46 between its uncoupled and coupled positions once the housing 24 of the plug-in unit is positioned on the housing 26 of the interface apparatus in the manner described above, which is illustrated in FIG. 6. To secure the plug-in unit 22 in place, the actuator assembly 48 includes a switch or lever 78, which is mounted on the side 34 of the housing 26 of the interface apparatus 20. The lever 78 is movable between three positions, a lower or "off" (release) position which is illustrated in FIG. 12, a middle or "retain" position which is not illustrated in the drawings but will be described, and an upper or "on" position which is illustrated in FIG. 13. These three positions will be described in greater detail below.

The lever 78 is mechanically coupled to a vertical retention hook 80 to rotate the retention hook between a disengaged (release) position in which a hook portion 82 of the retention hook extend toward the back wall 30 of the housing 26 (FIG. 12) and an engaged (retain) position in which the hook portion of the retention hook extends toward the side wall 34 of the housing (FIG. 13). The hook portion 82 of the retention hook 80 is configured to extend below the bottom wall 38 of the housing 26 of the interface apparatus 20 to engage the horizontal J-hook 76) of the plug-in unit 22 and prevent the plug-in unit from being removed from the housing 26 of the interface apparatus.

As mentioned above, FIG. 12 illustrates the lever 78 in the first or release position in which the retention hook 80 is disengaged from the housing 24 of the plug-in unit 22. This is referred to as the "off" position. The lever 78 is capable of being rotated or otherwise moved upwardly to the second or middle position in which the lever achieves a relatively horizontal position. In the second position, the hook portion 82 of the retention hook 80 engages the housing 24 of the plug-in unit 22 to prevent the removal of the plug-in unit from the housing 26 of the interface apparatus 20. In this position, the plug-in unit 22 is secured to the interface apparatus 20, however, electrical communication between the busway 10 and the plug-in unit is prevented since the movable electrical jaws 64 are in their retracted position. This is referred to as the "retain" position.

To complete the electrical connection of the plug-in unit 22 to the busway 10, the lever 78 further is mechanically coupled to the movable electrical jaws 64 to move the jaws between the disengaged (retracted) position illustrated in FIG. 12 and engaged (extended) position illustrated in FIG. 13. The lever 78 is rotated or moved upwardly to the third position in which the movable electrical jaws 64 are extended to engage the stabs provided on the outlet port 16 of the busway 10. This is referred to as the "on" position.

To move back to the "off" position, the lever 78 traverses from the "on" position towards the "retain" position, and the movable electric jaws 64 are retracted from contact points on the internal busbars of the outlet port 16 of the busway 10 with the result of the movable electric jaws being stowed inside the housing 26 of the interface apparatus 20. Electrical connection to the busway 10 is broken during this time. The movable electric jaws 64 continue to be retracted until they are completely stowed inside the housing 26 of the interface apparatus 20 by the time the lever reaches the position between the "retain" and "off" positions. As the lever 78 continues to traverse toward the "off" position, the hook portion 82 of the retention hook 80 is rotated 90 degrees away from the horizontal J-hook 76 of the housing 24 of the plug-in unit 22 so that they are disengaged from the plug-in unit.

In one embodiment, the lever 78 is connected to a linkage mechanism, which is configured to move the jaws 64. Such a linkage mechanism is disclosed in U.S. patent application Ser. No. 14/574,977 entitled RECESSED MOVABLE JAWS FOR CONNECTING A PLUG-IN UNIT TO A BUSWAY.

Figure 14:
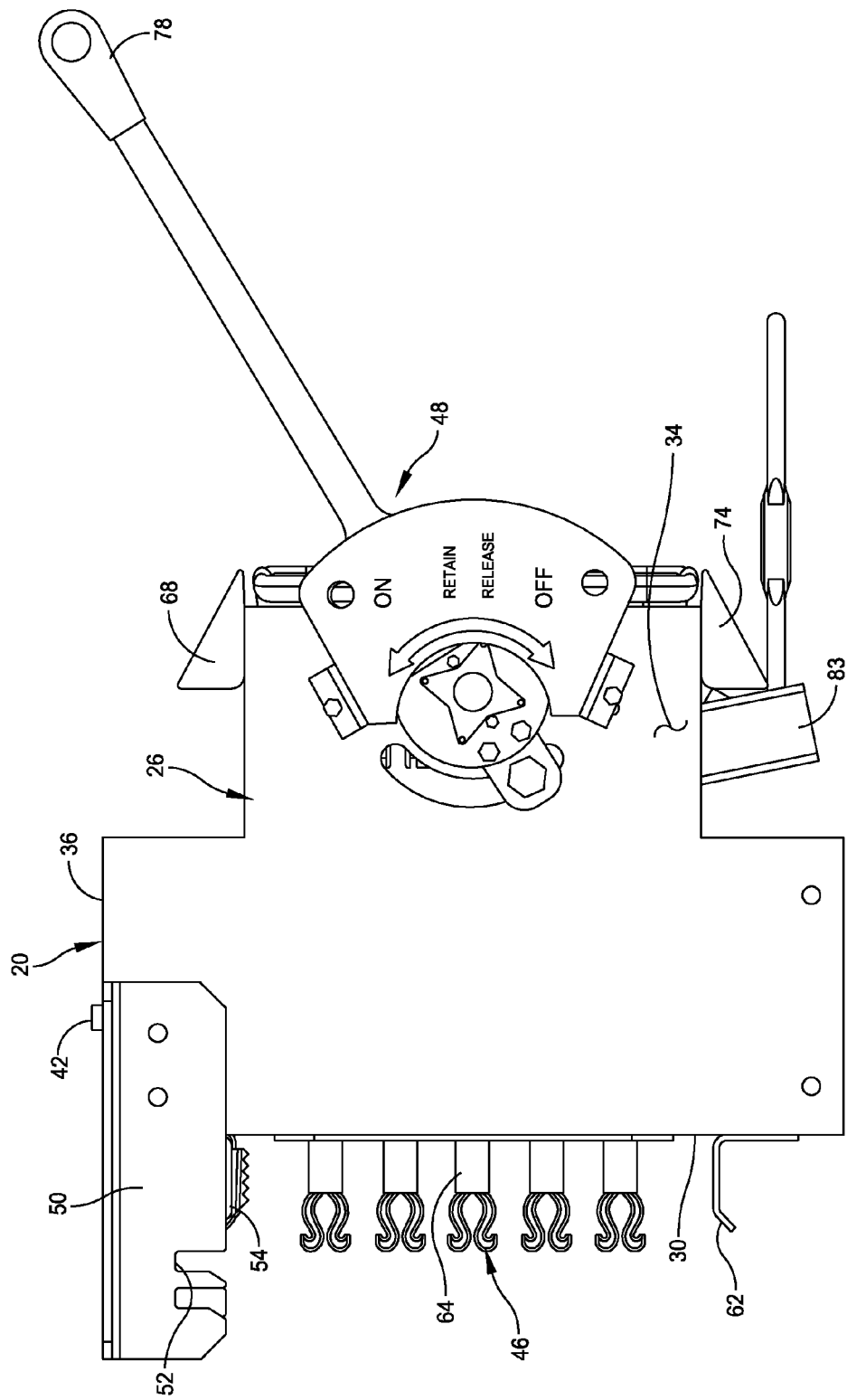
FIG. 14 is a side view of an interface apparatus of another embodiment of the disclosure in a retain or on position.
Figure 15:
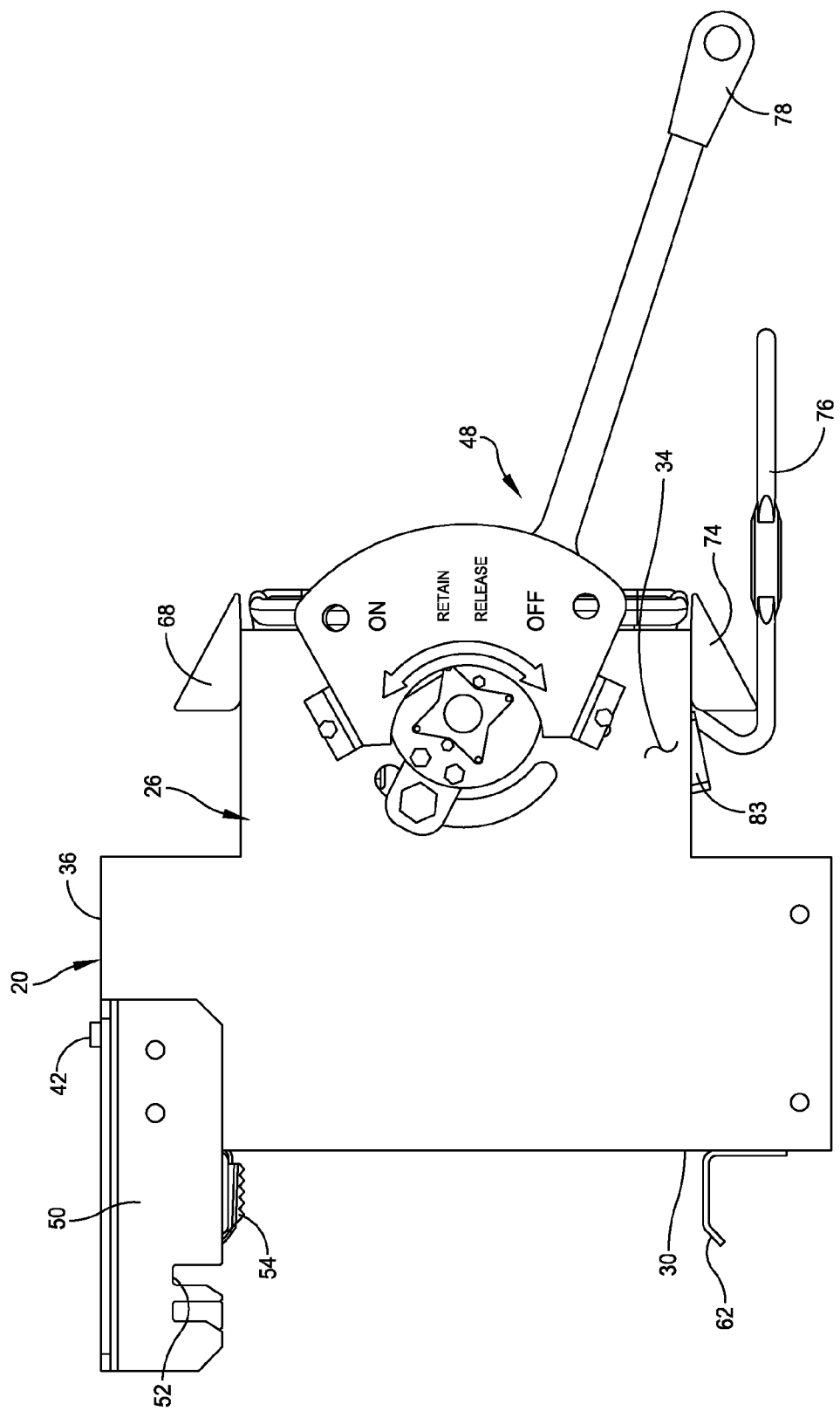
FIG. 15 is a side view of the interface apparatus shown in FIG. 14 in a release or off position.

FIGS. 14 and 15 illustrate an alternate embodiment of the interface apparatus having a different mechanism for securing the housing of the plug-in unit to the housing of the interface apparatus. A safety rod 83 is used instead of the vertical retention hooks 80 tied to the lever 78 to capture the horizontal J-hook 76 and to prevent it from being rotated, thereby keeping the plug-in unit 22 captive to the interface apparatus 20.

It should be understood that the handle or lever of the interface apparatus is provided to secure and enable electrical connection as described above. The plug-in interface on the front wall of the housing of the interface apparatus is a replica of the plug-in interface provided on the busway to accept jaws from a standard plug-in unit. Between the front and the back of the housing of the interface apparatus is an electrical insulator that prevents physical access to the unswitched phases or neutral by the front opening, which can further serve as an arc blast shield to prevent an arc blast of the insulator, keeping the plug-in unit side safe. The lever preferably is provided on the busway side of the insulator, keeping the plug-in unit side safe. The top wall of the housing of the interface apparatus replicates a top of the busway, to include a ground clip to connect to busway ground, and, if needed, to include a conductive pad area to accept ground clip from the plug-in unit, and to allow for connecting of the fixed bracket from the plug-in unit.

The lever may be configured to open up the phase(s) and/or neutral and/or ground, with sufficient current carrying capability, such as 100, 225, 400, or 600 amps. In some embodiments, multiple sizes of interface apparatus may be provided to mate with various busways. Internal contacts of the lever can be rated for no-load switching, with required label on unit to indicate that the circuit breaker in the plug-in unit must be open ("off") before either opening or closing the lever. Also, the plug-in interface may be configured to receive 4-jaw or the shown 5-jaw configuration of the plug-in unit.

One method of operating the lever is to have a large handle on one or more surfaces (for example, sides or top/bottom).

Another method of operating the lever will be to have a plunger or pin on one or more surfaces (for example, top and bottom). When the plunger or pin is down, that can be "on", and a red band can show on the plunger or pin near the bottom of the box, easily visible from the floor, and the "retain" feature will be holding the retention hook preventing the plug-in unit from being removed. When the plunger or pin is up, that can be "off," and a green band can show on the plunger or pin near the top of the box, visible when up on ladder near the box, and the "release" feature will not be holding the retention hook, thereby allowing the plug-in unit to be removed.

In some embodiments of the present disclosure, reference to the "electrical coupling assembly" refers to the retractable jaws feature on the inside of the interface box. In other embodiments, the retractable jaws can be replaced by a switch that is controlled by the lever. For example, the retractable jaws can be replaced by an electrical disconnect switch assembly that may be a 3-pole or 4-pole switch inside the interface box, operated by the external lever, sometimes referred to herein as the "actuator assembly", to open up the paths of the phases (and neutral) between the jaws on the back and the busbars on the front of the interface box.

In one embodiments of the present disclosure, reference to the "actuator assembly" refers to the lever on the outside of the interface box. As discussed, a purpose of the "actuator assembly" is to electrically disconnect the plug-in unit from the busbars in the busway (whether by opening a 4-pole switch inside the interface box when a switch is provided, or by retracting the jaws from the busway when the retractable jaws are provided.)

In another embodiment, the interface box may include three fuse holders inside the housing of the interface box, which are used for holding current limiting fuses, that would reduce severity of an arc flash in case one were to occur. The fuse holders can be located on a front side of an arc blast shield inside the interface box, and would be wired in the switched downstream side of the "electrical disconnect switch assembly", such that the fuses can be replaced even while the interface box is still attached to a powered busway, as long as the "actuator assembly" is in a down/off position.

Another embodiment may include a removable panel on a front of the interface box that covers the three fuse holders inside the interface box. The removable panel is used to provide access for easily replacing the fuses.

Another embodiment may include a locking handle on a bottom rear of the interface box to secure the interface box to the busway. The locking handle may include a key to unlock and remove it. The locking handle can be included instead of, or in addition to, the two J-hooks used to secure the interface box to the busway.

Another feature of the interface box can include the external lever (the "actuator assembly"), which has a round hole formed at an end of the lever. This round hole enables a generic hook stick to be inserted in the hole so as to operate the lever from the floor.

Another feature of the interface box can include the external lever (the "actuator assembly"), which is located at an end of the lever and extends out past the front of a plug-in unit that is attached to the front of the interface box, thereby further facilitating the use of a generic hook stick to operate the lever from the floor.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. An interface apparatus configured to be mechanically secured and electrically coupled to a busway, the interface apparatus comprising:
    a housing configured to mate with the busway;
    a plug-in interface coupled to the housing, the plug-in interface being configured to receive a plug-in unit;
    an electrical coupling assembly coupled to the housing and configured to move between an uncoupled position in which the plug-in interface is uncoupled to the busway and a coupled position in which the plug-in interface is electrically coupled to the busway; and
    an actuator assembly coupled to the housing and the electrical coupling assembly, the actuator assembly being configured to move the electrical coupling assembly between the uncoupled and coupled positions and to secure the plug-in unit to the housing.

2. The interface apparatus of claim 1, wherein the housing includes at least one bracket configured to align the plug-in unit to the housing.

3. The interface apparatus of claim 1, further comprising a mechanical coupling assembly coupled to the housing and configured to releasably secure the housing to the busway.

4. The interface apparatus of claim 3, wherein the mechanical coupling assembly includes a first bracket configured to engage a top of the busway.

5. The interface apparatus of claim 4, wherein the mechanical coupling apparatus further includes a second bracket secured to the housing and a hook coupled to the second bracket and configured to secure the housing to the busway.

6. The interface apparatus of claim 1, wherein the actuator assembly includes a lever coupled to the housing and the electrical coupling assembly, the lever being movable between a first position in which the housing is configured to receive the plug-in unit, a second position in which the plug-in unit is secured to the housing and the electrical coupling assembly is in the uncoupled position, and a third position in which the plug-in unit is secured the housing and the electrical coupling assembly is in the coupled position.

7. The interface apparatus of claim 6, wherein the actuator assembly further includes a finger movable by the lever to releasably secure the plug-in unit to the housing when moving the lever between the first position and the second position.

8. The interface apparatus of claim 6, wherein the electrical coupling assembly includes jaws configured to engage the busway.

9. The interface apparatus of claim 8, wherein the jaws are coupled to the lever, the jaws being movable by the lever when moving the lever from the second position in which the jaws achieve a disengaged position associated with the uncoupled position of the electrical coupling assembly with the jaws being spaced from the busway to the third position in which the jaws achieve an engaged position associated with the coupled position of the electrical coupling assembly with the jaws engaging the busway.

10. An interface apparatus configured to be mechanically secured and electrically coupled to a busway, the interface apparatus comprising:
    a housing configured to mate with the busway;
    a plug-in interface coupled to the housing, the plug-in interface being configured to receive a plug-in unit;
    means for using an electrical coupling assembly to electrically coupling the plug-in interface to the busway between an uncoupled position in which the plug-in interface is uncoupled to the busway and a coupled position in which the plug-in interface is electrically coupled to the busway; and
    means for actuating the movement of the electrical coupling means between the uncoupled and coupled positions and to secure the plug-in unit to the housing.

11. The interface apparatus of claim 10, wherein the housing includes at least one bracket configured to secure the plug-in unit to the housing.

12. The interface apparatus of claim 10, further comprising means for mechanical coupling the housing to the busway.

13. The interface apparatus of claim 10, wherein the means for actuating the movement of the electrical coupling means includes a lever coupled to the housing and movable between a first position in which the housing is configured to receive the plug-in unit, a second position in which the plug-in unit is secured to the housing and the electrical coupling means is in the uncoupled position, and a third position in which the plug-in unit is secured the housing and the electrical coupling means is in the coupled position.

14. The interface apparatus of claim 13, wherein the means for actuating the movement of the electrical coupling means further includes a finger movable by the lever to releasably secure the plug-in unit to the housing when moving the lever between the first position and the second position.

15. The interface apparatus of claim 13, wherein the electrical coupling means includes jaws configured to engage the busway.

16. The interface apparatus of claim 15, wherein the jaws are coupled to the lever, the jaws being movable by the lever when moving the lever from the second position in which the jaws achieve a disengaged position associated with the uncoupled position of the electrical coupling assembly with the jaws being spaced from the busway to the third position in which the jaws achieve an engaged position associated with the coupled position of the electrical coupling assembly with the jaws engaging the busway.

* * * * *